(12) United States Patent
Alhuwaish et al.

(10) Patent No.: US 11,813,133 B1
(45) Date of Patent: Nov. 14, 2023

(54) TOOL FOR MEASURING INCLINATION OF MAXILLARY INCISORS

(71) Applicant: KING SAUD UNIVERSITY, Riyadh (SA)

(72) Inventors: Hessah Abdullah M. Alhuwaish, Riyadh (SA); Abdullah Mohammad Aldrees, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/134,235

(22) Filed: Apr. 13, 2023

(51) Int. Cl.
*A61C 19/04* (2006.01)

(52) U.S. Cl.
CPC ................................ *A61C 19/04* (2013.01)

(58) Field of Classification Search
CPC ........ A61C 19/04; A61C 19/045; A61C 19/05
See application file for complete search history.

(56) References Cited

U.S. PATENT DOCUMENTS

| | | | | |
|---|---|---|---|---|
| 1,052,806 | A | * | 2/1913 | Evans ................... A61C 19/045 433/73 |
| 2,491,136 | A | | 12/1949 | Salzmann |
| 3,693,260 | A | * | 9/1972 | Hernandez ........... A61C 19/045 433/56 |
| 3,745,665 | A | | 7/1973 | Shilliday |
| 4,762,491 | A | | 8/1988 | Bolton |
| 4,979,312 | A | * | 12/1990 | Wool ....................... A61C 7/02 33/513 |
| 5,078,600 | A | * | 1/1992 | Austin ................. A61C 19/045 433/69 |
| 5,176,515 | A | * | 1/1993 | Andrews .............. A61C 19/045 433/56 |
| 5,738,517 | A | * | 4/1998 | Keller .................... A61C 19/04 433/73 |

(Continued)

FOREIGN PATENT DOCUMENTS

| | | |
|---|---|---|
| DE | 2716961 A1 | 10/1978 |
| RU | 2218127 C1 | 12/2003 |

OTHER PUBLICATIONS

Ghahferokhi et al., "Critical assessment of a device to measure incisor crown inclination," American Journal of Orthodontics and Dentofacial Orthopedics, vol. 121, No. 2, Feb. 2002, Copyright © 2002 by the American Association of Orthodontists.

*Primary Examiner* — Nicholas D Lucchesi
(74) *Attorney, Agent, or Firm* — Nath, Goldberg & Meyer; Richard C. Litman

(57) ABSTRACT

A tool for measuring the inclination of maxillary incisors can accurately quantify the clinical inclination of the maxillary incisors relative to a true horizontal reference plane before and during dental treatment. The tool includes a stationary base and a measuring arm pivotably connected to the base. The base includes a main window defined therethrough and a spirit level. The movable arm includes a protractor, a sleeve connected to the protractor, and a sliding sheet slidably received within the sleeve. An adjustable incisor guide at a measuring end of the sliding sheet includes an incisor ledge for receiving an incisor edge during measurement. The spirit level can be used to align the base with the true horizontal plane and the movable arm can be raised until the incisor ledge contacts the incisor edge and the sliding sheet contacts the facial surface of the maxillary incisor.

12 Claims, 3 Drawing Sheets

(56) References Cited

U.S. PATENT DOCUMENTS

| | | | |
|---|---|---|---|
| 6,109,917 A * | 8/2000 | Lee | A61C 19/045 |
| | | | 433/68 |
| 6,945,779 B2 | 9/2005 | Richmond | |
| 9,072,575 B1 | 7/2015 | Alotaibi | |
| 9,987,111 B1 | 6/2018 | Alhuwaish et al. | |
| 2006/0188839 A1* | 8/2006 | Adams | A61C 19/05 |
| | | | 433/68 |
| 2010/0229413 A1* | 9/2010 | Polei | G01B 3/563 |
| | | | 33/514 |
| 2013/0084537 A1* | 4/2013 | Cho | A61C 19/045 |
| | | | 433/29 |
| 2015/0327967 A1* | 11/2015 | Baaske | A61C 13/00 |
| | | | 433/68 |
| 2022/0142758 A1* | 5/2022 | Schlieper | A61C 9/0053 |
| 2023/0059202 A1* | 2/2023 | Rampulla | A61C 11/001 |

\* cited by examiner

TOOL FOR MEASURING INCLINATION OF MAXILLARY INCISORS

BACKGROUND

1. Field

The disclosure of the present application relates to an orthodontic tool and, particularly, to an orthodontic tool for determining the clinical inclination of the maxillary incisors with reference to a true horizontal plane.

2. Description of the Related Art

Several dental specialties including orthodontics, restorative dentistry, cosmetic dentistry, and prosthodontics are involved with dental aesthetics, such as the inclination (degree of labiolingual "forward" or "backward" angulation of the long axis) of the maxillary incisors because correct incisor inclination contributes to smile aesthetics and overall facial appearance of the patient. Proper diagnosis in orthodontics includes an accurate assessment of the inclination of the maxillary incisors. Progress of tooth movement must also be monitored throughout treatment by evaluation of the position of the upper incisors.

Since the development of X-rays, dentists have always relied on lateral cephalometric radiographs to measure the degree of inclination of maxillary incisors. Previous attempts to minimize the exposure of patients to ionizing radiation have led to the development of gauges to assess the clinical crown inclination. This method has the advantage of evaluating the inclination of the clinical crown of the incisors as opposed to visually assessing the inclination of the long axis of the teeth as was traditionally done using radiographic images.

Prior orthodontic tools typically failed to assess the inclination of the maxillary incisors in relation to a true horizontal plane or the same reference people use when they view their smile in the mirror. For example, some conventional orthodontic tools measure the inclination of the upper incisors in relation to the maxillary occlusal plane. As the maxillary occlusal plane varies among patients and can even change during surgery, however, this plane cannot serve as a reliable landmark throughout treatment.

Thus, a tool for measuring the inclination of maxillary incisors solving the aforementioned problems is desired.

SUMMARY

A tool for measuring the inclination of maxillary incisors can accurately quantify the clinical inclination of the maxillary incisors relative to a true horizontal reference plane before and during dental treatment. The tool can measure the exact degree of inclination of the clinical crown of the upper incisors, for example, the tilt of the facial surface of the incisors, even with the presence of orthodontic brackets bonded on the surface. The true horizontal plane refers to a plane that is parallel to the horizontal support surface upon which the user is positioned.

The tool for measuring the inclination of maxillary incisors includes a stationary base and a measuring arm pivotably connected to the base. The base includes an opening or main window defined therethrough and a spirit level attached to an upper surface of the base. The movable arm includes a protractor, a sleeve connected to the protractor and a sliding sheet slidably received within the sleeve. An adjustable incisor guide at a measuring end of the sliding sheet includes an incisor ledge for receiving an incisor edge during measurement. In use, the spirit level can be used to align the base with the true horizontal plane and the movable arm can be raised until the incisor ledge contacts the incisor edge and the sliding sheet contacts the facial surface of the maxillary incisor. The number of degrees shown on the exposed protractor under the base body frame indicates the amount of the clinical inclination of the incisor.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
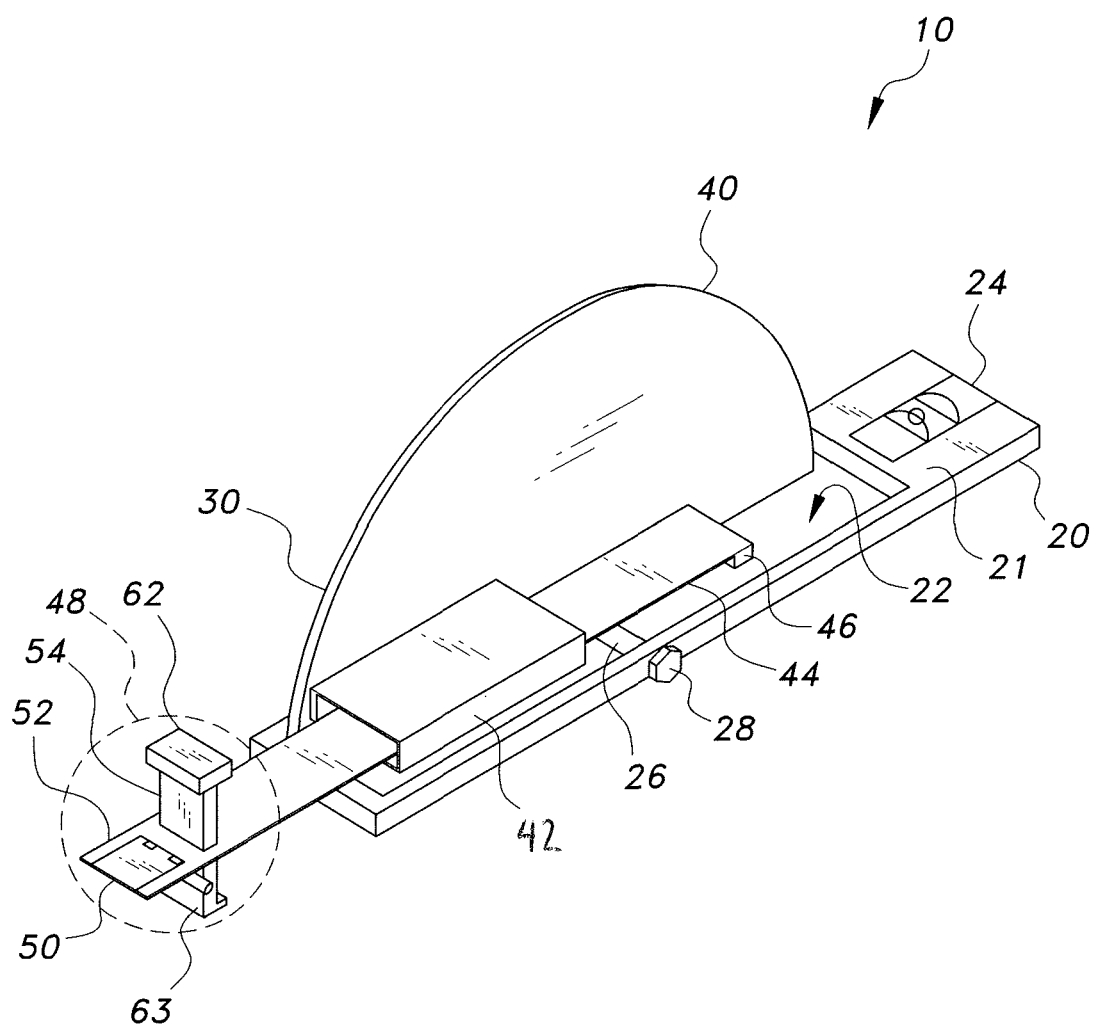
FIG. 1 is a perspective view of the tool for measuring inclination of maxillary incisors when the measuring arm is in a lowered position.
Figure 2:
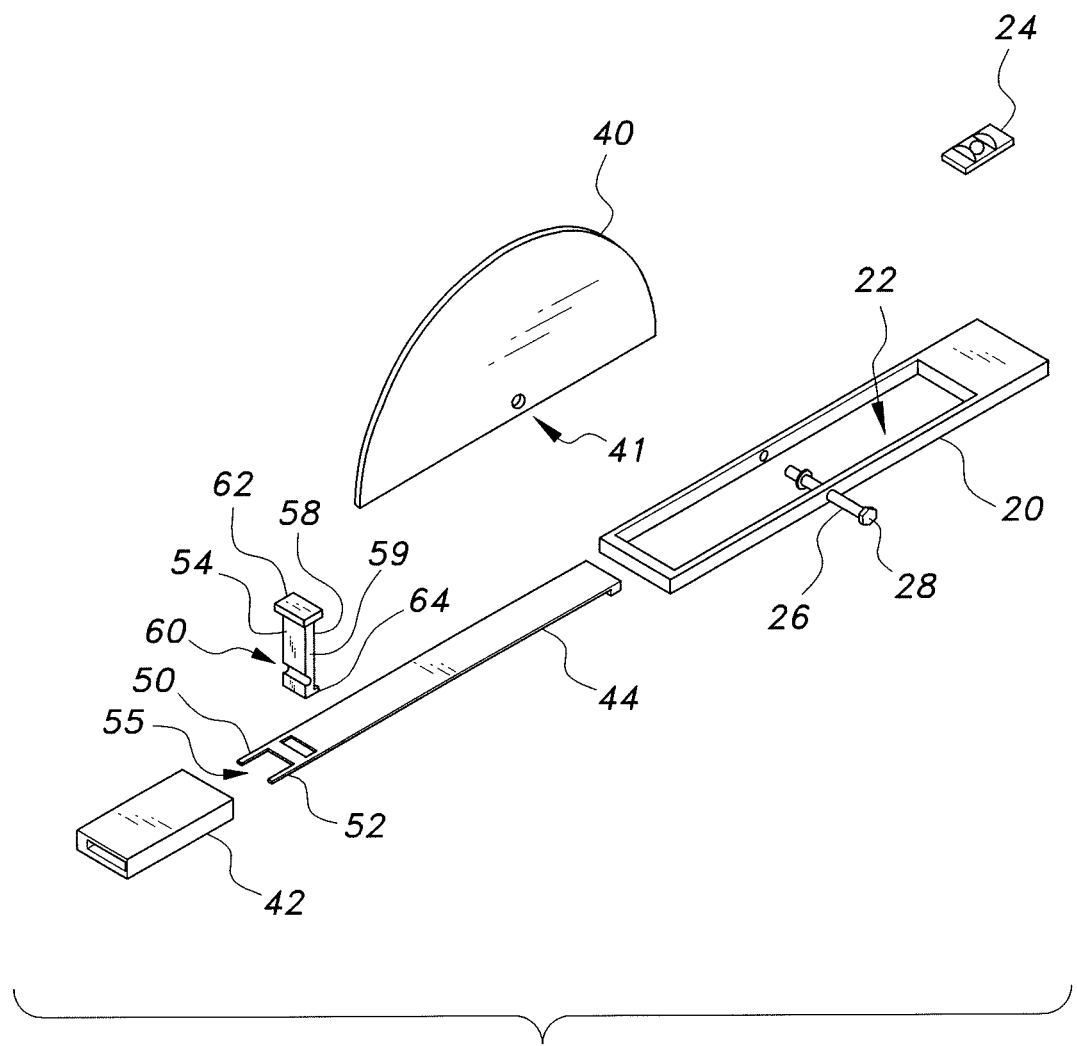
FIG. 2 is an exploded view of the tool for measuring inclination of maxillary incisors.
Figure 3:
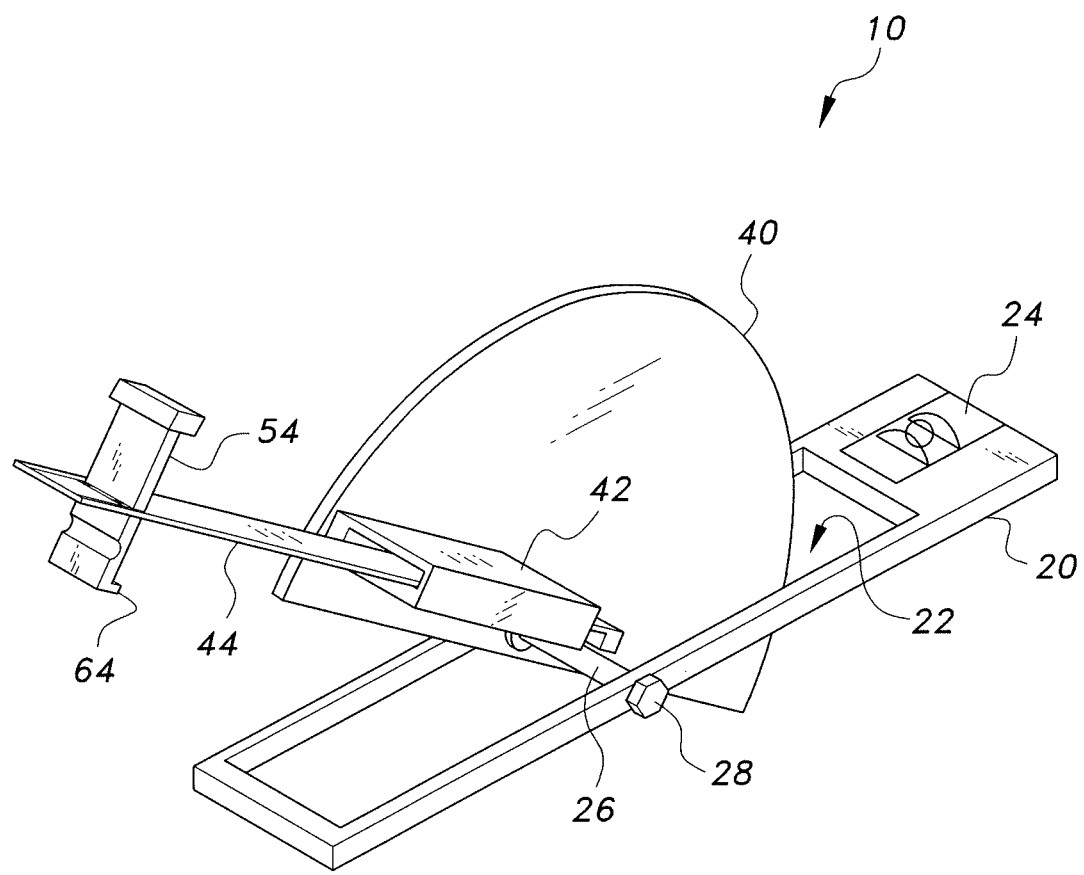
FIG. 3 is a perspective view of the tool for measuring inclination of maxillary incisors when the measuring arm is raised and the protractor has been rotated.

FIGS. 1-3 depict an embodiment of the tool for measuring inclination of maxillary incisors 10. The tool 10 includes a stationary base 20 and a measuring arm 30 pivotably connected to the base 20. The base 20 includes a generally rectangular body 21, an opening or main window 22 defined through the body 21 and a spirit level 24 attached to an upper surface of the body 21. A rod 26 extends across a central portion of the window 22 and connects to opposing sides of the base at opposing rod ends. A thumbscrew or other suitable connecter can be used to connect opposing ends of the rod to the base 20. The spirit level 24 can be used to align the base 20 with the true horizontal plane, i.e., a plane that is perfectly parallel to the horizontal plane of the floor or horizontal support on which the patient is situated. The true horizontal plane can be the reference plane against which teeth inclination is typically assessed for aesthetic purposes by the patient.

The movable arm 30 includes a protractor 40, a sleeve 42 connected to the protractor 40 and a sliding sheet 44 slidably received within the sleeve 42. The protractor 40 can be pivotably connected to the rod 26. A graduated angular scale or angle measurement indicia can be defined on the protractor as with a conventional protractor. Indicia representing a degree of 0 and 180 degrees can be the parallel to the base 20 when the protractor 40 is in an upright position, i.e. not tilted. The sleeve 42 is attached to the protractor 40 and is parallel to the 0 degree line and the 180 degrees line of the protractor.

A sheet lock 46 extends normal to the first end of the sliding sheet 44 to prevent the sheet 44 from sliding out of the sleeve 42. A measuring tip 48 is defined by a second, opposing end of the sliding sheet 44. The measuring tip 48 includes an incisor guide 54 and a movable bracket door 50. The incisor guide 54 extends normal to the sliding sheet 44 and is adjustably connected thereto. The door 50 is pivotably connected the sliding sheet 44, e.g., by a hinge 52. The door 50 can be opened outward to accommodate an orthodontic bracket, if present, on the patient's incisors.

As shown in FIG. 2, an opening or incisor guide window 56 is defined within the second end of the sliding sheet 44 for adjustably receiving the incisor guide 54 therethrough. The incisor guide 54 includes a vertical support 59, a first notch 58 on a first surface of the vertical support and a second notch 60 on a second, opposing surface of the vertical support 59. The first notch 58 is configured to engage the slidable sheet at one side of the window 56. The second notch 60 is configured to engage the slidable sheet at an opposing side of the window. The incisor guide 54 can be raised or lowered within the window 56, as desired. An incisor ledge 64 extending from a lower edge of the incisor guide 54 can receive the incisor edge during measurement. A level of the incisor ledge 64 can be adjusted for each patient by moving the incisor guide 54 upward or downward as needed. When an adjacent tooth has an orthodontic bracket in place, the door 50 can be opened outward during measurement to allow the bracket to protrude through the resulting opening. The incisor guide 54 can then be positioned on the facial surface of the incisor for which the inclination angle is to be determined and the incisor edge can be positioned on the incisor ledge of the incisor guide without interference.

When the sliding sheet 44 is pulled out while in use, the lock 46 prevents the sheet 44 from sliding out of the sleeve 42. An upper lock 62 and a lower lock 63 at opposite ends, respectively, of the incisor guide 54 allow controlled sliding (upward and downward) of the incisor guide 54. The incisor ledge 64 acts as a stabilizer for the incisor edge during the measurement.

In use, the true horizontal plane can be determined using the spirit level 24 as a reference. The base 20 can then be positioned perfectly parallel to the true horizontal plane. If orthodontic brackets are not in place, the bracket door 50 can be closed, and the sliding sheet 44 can be pulled out by the practitioner and raised until a lower surface of the measuring tip 19 is placed over the facial surface of the maxillary incisor, and the incisor edge rests on the incisor ledge 64. Raising the sliding sheet 44 rotates the protractor 40, with a portion of the protractor extending below the base 20. The degree of inclination of the upper incisor in relation to the horizontal plane can be determined by the angle formed by the protractor and the lower edge of the base.

The incisors crown inclination tool can be manufactured from any material that can be disinfected or sterilized.

It is to be understood that the tool for measuring inclination of maxillary incisors is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A tool for measuring inclination of maxillary incisors, comprising:
   a base having a body, a main window defined through a portion of the body, and a spirit level attached to an upper surface of the body;
   an arm pivotably connected to the base, the arm including a protractor, a stationary sleeve connected to a front surface of the protractor, and a slidable sheet slidably connected to the sleeve, the slidable sheet including a sheet lock extending normal to a first end thereof and an incisor guide extending through the slidable sheet at a second end thereof, wherein
   the incisor guide is adjustably connected to the second end of the slidable sheet.

2. The tool for measuring inclination of maxillary incisors of claim 1, wherein the second end of the slidable sheet further comprises:
   a door pivotably connected to an inner surface of the slidable sheet.

3. The tool for measuring inclination of maxillary incisors of claim 1, further comprising a central rod connected to opposing sides of the body and extending across the window, one end of the rod being pivotably connected to the protractor.

4. The tool for measuring inclination of maxillary incisors of claim 1, wherein the base body is generally rectangular.

5. The tool for measuring inclination of maxillary incisors of claim 1, wherein the incisor guide comprises:
   a vertical support;
   a first incisor guide notch defined within a first surface of the vertical support;
   a second incisor guide notch defined within a second surface of the vertical support; and
   an incisor ledge extending from a bottom end of the vertical support.

6. The tool for measuring inclination of maxillary incisors of claim 5, wherein the incisor guide further comprises a superior incisor guide lock extending from a top end of the vertical support.

7. A tool for measuring inclination of maxillary incisors, comprising:
   a base having a body, a main window defined through a portion of the body, and a spirit level attached to an upper surface of the body;
   an arm pivotably connected to the base, the arm including a protractor, a stationary sleeve connected to a front surface of the protractor, and a slidable sheet slidably connected to the sleeve, the slidable sheet including an incisor guide extending therethrough and a door pivotably connected to an inner surface of the slidable sheet, wherein
   the incisor guide is adjustably connected to the second end of the slidable sheet.

8. The tool for measuring inclination of maxillary incisors of claim 7, further comprising a sheet lock extending normal to a first end of the sliding sheet.

9. The tool for measuring inclination of maxillary incisors of claim 7, further comprising a central rod connected to opposing sides of the body and extending across the window, one end of the rod being pivotably connected to the protractor.

10. The tool for measuring inclination of maxillary incisors of claim 7, wherein the base body is generally rectangular.

11. The tool for measuring inclination of maxillary incisors of claim 7, wherein the incisor guide comprises:
    a vertical support;
    a first incisor guide notch defined within a first surface of the vertical support;
    a second incisor guide notch defined within a second surface of the vertical support; and
    an incisor ledge extending from a bottom end of the vertical support.

12. The tool for measuring inclination of maxillary incisors of claim 11, wherein the incisor guide further comprises a superior incisor guide lock extending from a top end of the vertical support.

* * * * *